United States Patent [19]

Chupurdy

[11] 4,167,136
[45] Sep. 11, 1979

[54] BEVERAGE BREWER

[76] Inventor: Garry C. Chupurdy, 2494 23rd St., Wyandotte, Mich. 48192

[21] Appl. No.: 818,542

[22] Filed: Jul. 25, 1977

[51] Int. Cl.² .............................................. A47J 31/10
[52] U.S. Cl. ....................................... 99/306; 99/322
[58] Field of Search ................. 99/306, 295, 319, 321, 99/304, 322; 210/496

[56] References Cited

U.S. PATENT DOCUMENTS

| | | | |
|---|---|---|---|
| 1,108,288 | 8/1914 | Watson | 99/304 |
| 1,377,316 | 5/1921 | Clermont | 99/306 |
| 1,476,959 | 12/1923 | Duncan | 99/322 |
| 1,499,281 | 6/1924 | Altieri | 99/306 |
| 2,053,004 | 9/1936 | Larsen | 99/306 |
| 2,234,397 | 3/1941 | Bentz | 99/306 UX |
| 2,601,821 | 7/1952 | Johnson | 99/322 X |
| 2,732,787 | 1/1956 | Osborne | 99/295 X |
| 3,086,447 | 4/1963 | Arnett et al. | 99/295 |
| 3,695,168 | 10/1972 | Van Brunt | 99/306 |
| 3,858,493 | 1/1975 | Hermsen | 99/306 |
| 3,971,305 | 7/1976 | Daswick | 99/295 |
| 3,975,996 | 8/1976 | Vitous | 99/304 X |
| 4,027,582 | 6/1977 | O'Connell | 99/306 |
| 4,069,751 | 1/1978 | Gronwick et al. | 99/306 |

FOREIGN PATENT DOCUMENTS

1114920 of 1956 France ............................................. 99/306

Primary Examiner—Harvey C. Hornsby
Assistant Examiner—Arthur O. Henderson
Attorney, Agent, or Firm—Basile and Weintraub

[57] ABSTRACT

A coffee brewer, and, in particular, a single cup coffee brewer includes separate first and second members. The first member seats on a cup or similar receptacle and has a ground coffee receiving chamber formed therein. The second member is used to regulate the flow of hot water of similar fluid into the chamber. An aperture formed in the first member allows brewed coffee to flow from the chamber into the receptacle and regulates, by its size, the flow time of brewed coffee into the receptacle. A seal between the two members prevents the ground coffee from soaking in the brewing fluid.

14 Claims, 8 Drawing Figures

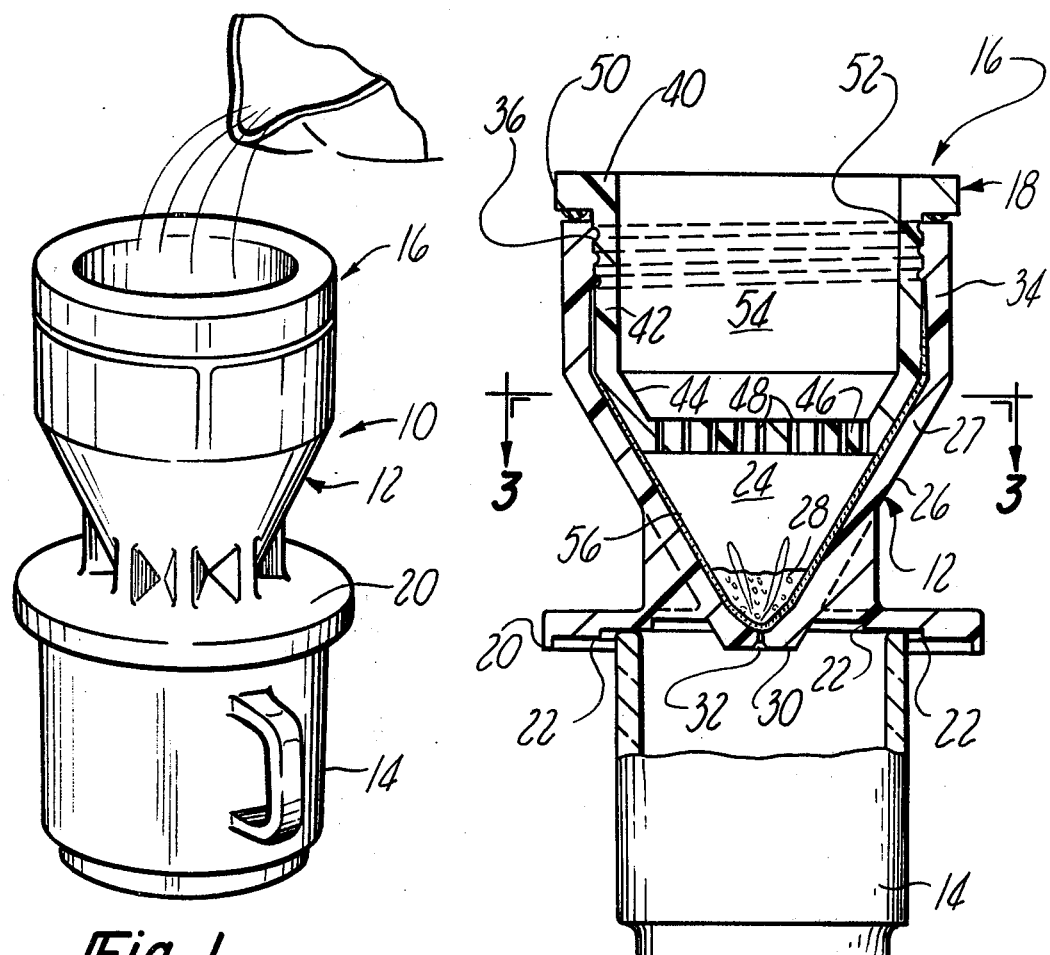
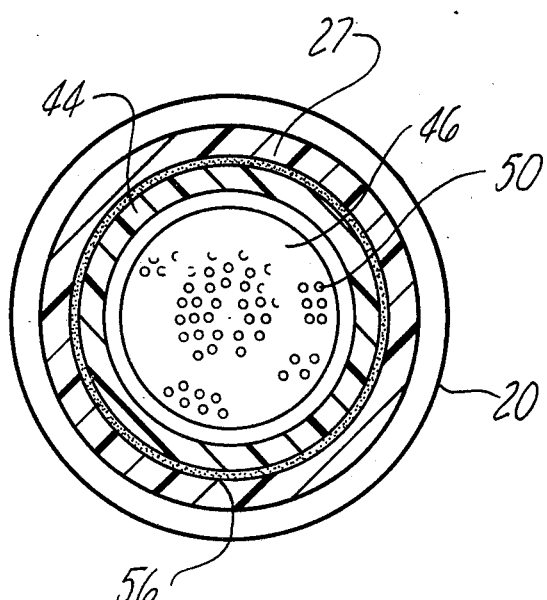

BEVERAGE BREWER

BACKGROUND OF THE INVENTION

1. Field of the Invention

The present invention pertains to beverage preparation devices. More particularly, the present invention pertains to devices for preparing hot beverages, such as coffee or tea. Even more particularly, the present invention pertains to single-serving devices of the kind specified hereinabove.

2. Prior Art

Within the last decade there has been a proliferation in the field of home coffee brewers. This increase has been dictated by many factors. Initially, the presently promoted devices eliminate the need for percolating the coffee grounds. Secondly, the amount of brewed coffee which can be prepared at any one time can be varied. Furthermore, these devices permit the preparation of hot water, alone, which can, then, be utilized for preparing "instant" beverages and other foodstuffs. Most importantly, these devices achieve their ultimate goals in a minimal amount of time.

Essentially, the presently known devices incorporate a heating coil which is used to bring cold water, coming into contact therewith, to approximately boiling temperature. This hot water is, then, passed directly into a receiving receptacle to prepare hot water or is passed into a coffee ground-containing device or chamber. When the hot water is passed into the chamber it is retained therein for a nominal amount of time, by virtue of a porous filter, sufficient to extract coffee flavor from the grounds. As noted, such devices are known to the skilled artisan.

One drawback encountered with these devices is that they are not adaptable for preparing a single serving or single cup with facility. Rather, this is an area within the art which has been neglected. The present invention, as will subsequently be detailed, provides an efficient single serving brewer without any of the drawbacks of the relevant prior art.

Presently known single serving brewers inherently soak the coffee in the brewing medium, thereby, providing a poor quality beverage. The present invention alleviates this situation.

PRIOR ART STATEMENT

The present invention is distinguishable from the relevant prior art set forth below in its two member construction; the sealing means utilized, as well as, the pressure differentials created. By the present construction, coffee grounds or similar foodstuffs do not soak and/or float within the brewing medium during brewing.

To applicant's knowledge the most relevant prior art is found in the following cited references: U.S. Pat. Nos. 2,835,191; 1,496,493; 3,811,373; 3,266,411; 767,778; 3,800,690; 1,108,288; 3,985,069; 3,615,708; 3,334,574; 3,971,305.

SUMMARY OF THE INVENTION

In accordance with the present invention there is provided a beverage brewer, and in particular, a single-serving beverage brewer. The brewer hereof is peculiarly advantageous for the preparation of single servings of hot coffee. The brewer hereof, generally, comprises first and second separable members. The first member seats on a brewed beverage-receiving receptacle and has a "grounds" storing chamber formed therein or a grounds storing member seatable within the first members. The first member, also, includes means for issuing brewed beverage therefrom into the receptacle. The issuing means is, ordinarily, an aperture the size of which determines the brewing time. The first member is interconnectable to the second member which seats thereatop.

The second member is a multi-apertured member which is in communication with the grounds-storing or -receiving chamber or seating member. A brewing medium, such as hot water, flows through the apertures and into the chamber where extraction and brewing occurs. The brewed beverage, then, flows through the issuing means.

In accordance herewith the present invention further includes sealing means for sealingly interconnecting the first and second members. The sealing means regulates brewing medium flow such that the grounds do not soak and/or float in the medium as a result of the pressure differential between the two members.

For a more complete understanding of the present invention reference is made to the following detailed description and accompanying drawing. In the drawing like reference characters refer to like parts throughout the several views, in which:

BRIEF DESCRIPTION OF THE DRAWING

FIG. 1 is a perspective view of a first embodiment of the present invention, as seated upon a cup;

FIG. 2 is a side elevational view, partly in cross-section of the first embodiment hereof;

FIG. 3 is a cross-sectional view taken along line 3—3 of FIG. 2;

DETAILED DESCRIPTION OF THE PREFERRED EMBODIMENTS

Figure 4:
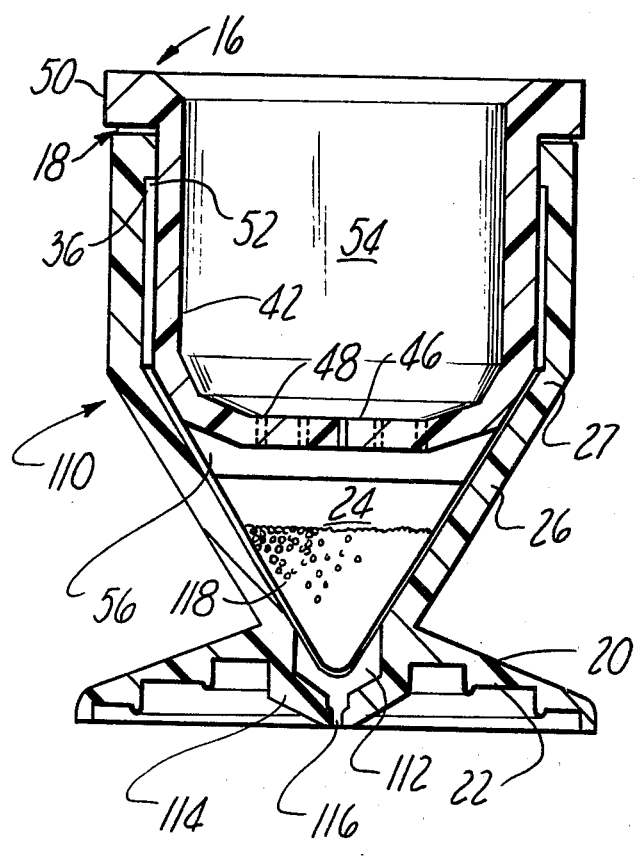
FIG. 4 is a cross-sectional view of an alternate embodiment of the present invention.

Now, and with reference to the drawing, there is depicted therein a beverage brewer in accordance with the present invention, and, generally, denoted at 10. At the outset, it should be noted that the present invention is capable of preparing single servings of beverages such as coffee, tea and the like, as well as other foodstuffs which utilize an extraction technique based up liquid-solid contact. However, since the present invention is particularly advantageous for preparing single servings of coffee from hot water, the device 10 hereof will be referred to herein and in the claims as a "coffee brewer" although it is not intended to be so-limited.

Referring, again, to the drawing, and, in particular, FIGS. 1, 2 and 3, the device 10 hereof, generally, comprises (a) a first member 12 adapted to seat upon a brewed beverage-receiving receptacle, such as a cup 14, and having a chamber 24 for receiving a ground foodstuff, (b) a second member 16 which delivers brewing medium to the first member, and (c) means 18 for sealingly interconnecting the first and second members upon interconnection therebetween.

With more particularity, the first member 12 comprises a base 20. The base 20 has a plurality of stepped or graduated annular recesses 22 formed therein. The recesses 22 are concentric and of varying diameters, as shown. The recess of greatest diameter has the least depth of penetration into the base, as shown, to permit the stepped effect. The recesses 22 define seats to permit the base to be seated on the lip of the cup 14 or other similar receptacle. The varying recesses enable receptacles of varying diameters.

The member 12 further comprises means defining a foodstuff storage receptacle or chamber 24. The chamber 24 is, preferably, defined by an inverted conical member 26 which extends upwardly from the base 20. Ground foodstuff, such as coffee grounds 28, from which the beverage is to be extracted are disposed within the chamber prior to brewing.

As shown in the drawing, the member 26 has a conical configuration and is concentric with the base 20. The apex 30 projects into the void or area of the recesses 22, as shown whereby the top thereof is coplanar with the bottom of the base. The interior of the cone, as noted defines the chamber 24. An opening or bore 32 is formed in the apex 30. The bore 32 provides communication between the chamber 24 and the interior of the cup 14. It is to be appreciated that the bore 32 defines means for issuing brewed beverage from the chamber into the cup.

As shown in FIG. 2 the base 20 is an annular member which is integrally formed with member 26 about the apex thereof.

The first member 12, also, includes a substantially cylindrical wall 34 which is integrally formed with member 26. The wall 34 extends from and is continuous with the free end of member 26. The volume within the wall 34 is used to nest the second member 16. The interior of wall 34 has a threaded profile 36. the threaded profile 36, as will subsequently be described, cooperates with a complementary profile provided on the second member 16 for achieving interconnection between the first and second members.

Affixed atop the free edge of the wall 34 is the sealing means 18. The sealing means 18 comprises a gasket or other sealing material for effectuating a sealing interengagement between the first and second members.

As heretofore noted, the present invention comprises a second member 16 interconnectable with the first member 14. The second member 16 is utilized to deliver brewing fluid, such as hot water, to the chamber 24 for brewing the coffee contained therewithin. The second member comprises an open topped receptacle 40 having a volume equal to that of the receptacle. The second member 16, also, comprises a sidewall 42 dimensioned substantially equal in height to that of sidewall 34. Integrally formed with the wall 42 is a diverging wall 44 which is analogously configured to that of the wall 27 of member 26. The wall 44 is contiguous with the wall 27. A base wall 46 truncates the wall 44 and, when in position, is substantially parallel to the base 20. A plurality of apertures 48 are formed in the base wall 46. The apertures 48 communicate with the chamber 24. The second member 16 further comprises a rim or flange 50 which is integrally formed with and at the free end of the wall 42. The rim seats and abuts against the sealing means or seal 18 upon interconnection between the first and second members.

The outer periphery of wall 42 is provided with a threaded profile 52. The profile 52 is complementary to that of profile 36.

The interior 54 defined by the second member 16 accommodates a volume of brewing fluid therewithin.

In utilizing the present invention the first member and second member are threadably interconnected such that there is a seal effectuated therebetween. The seal prevents air from passing between the two members other than substantially via apertures 48 and bore 32. Because of the pressure differentials between the atmosphere and the chamber 24, as a result of the seal between the two members brewing fluid does not sit in the chamber and accumulate. Rather, the holding time within the chamber is sufficient for the fluid to extract color and flavor from the grounds. As a result of the present construction the grounds do not soak or float in the brewing fluid or medium.

In utilizing the present invention a filtering paper or similar filter 56 is disposed in the chamber 24. Coffee grounds or similar foodstuff 28 is placed within the chamber. The two members are, then, threadably interconnected and the seal therebetween effectuated. The assembly is then seated on a cup and hot water or similar fluid is poured into the interior 54 wherefrom it passes into chamber 24 where it brews the beverage, and the brewed beverage enters the cup through the bore 32.

Referring, now, to FIG. 4 there is depicted therein an alternate embodiment of the present invention, generally, denoted at 110. For purposes of brevity the ensuing discussion will detail only the differences between this embodiment and that shown in FIGS. 1-3. Therefore, it can be presumed that in all other respects the two embodiments are similar.

In accordance with this embodiment of the invention the apex of member 26 terminates in a funnel-shaped chamber 112, the wall 114 defining the chamber is integral with the wall 27. A bore 116 extends between the chamber 112 and the atmosphere.

A conical filter paper 118 is disposed in the chamber 24 with the apex thereof extending into the chamber 112.

In brewing coffee utilizing the brewer of this embodiment the brewed coffee issues into the chamber 112 prior to traveling into the cup.

It has been found in accordance herewith that the holding chamber 112 creates a more even pressure differential about the apex of the filter causing a more uniform beverage flow into the cup 14.

Figure 5:
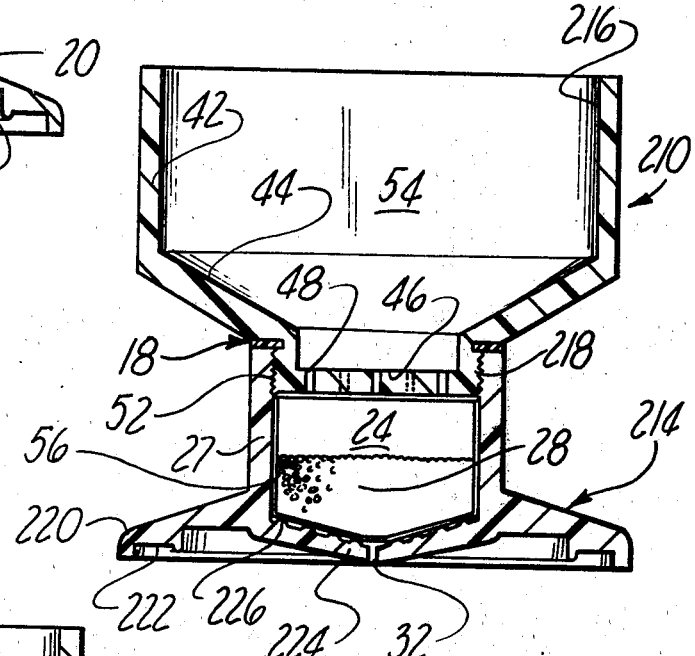
FIG. 5 is a cross-sectional view of a still further embodiment of the present invention.

Referring now to FIG. 5 there is depicted therein a still further embodiment of the present invention, generally, denoted at 210. In accordance herewith the second member 216 has a substantially funnel shaped configuration terminating in a neck 218. The exterior of the neck is provided with a threaded profile 252.

At the junction of the neck 218 with the diverging 44 is disposed the sealing means 18 which is securely affixed to the exterior of the member 216 thereat. The wall 46 is analogous to the base 20 of the embodiment shown in FIGS. 1-3.

Also, in accordance with the device 210 the first member 214 comprises the base 220 having recesses 222, as heretofore defined. The member 214 includes a substantially cylindrical upstanding sidewall 27 integrally formed with the base. A conical wall 224 is integral with the sidewall 27 and defines the base or bottom of the chamber 24. The interior surface of the wall 224 has a plurality of ribs 226 formed therearound. The ribs negate adhesion between the saturated filter 56 and the walls of the chamber.

Furthermore, and as shown in the drawing, the interior surface of the wall 27 proximate the upper end thereof is threaded complementarily to the threaded profile 52 to effectuate threaded interengagement between the members.

This embodiment of the invention provides a substantial reduction in the amount of material necessary to fabricate the device hereof.

Figure 6:
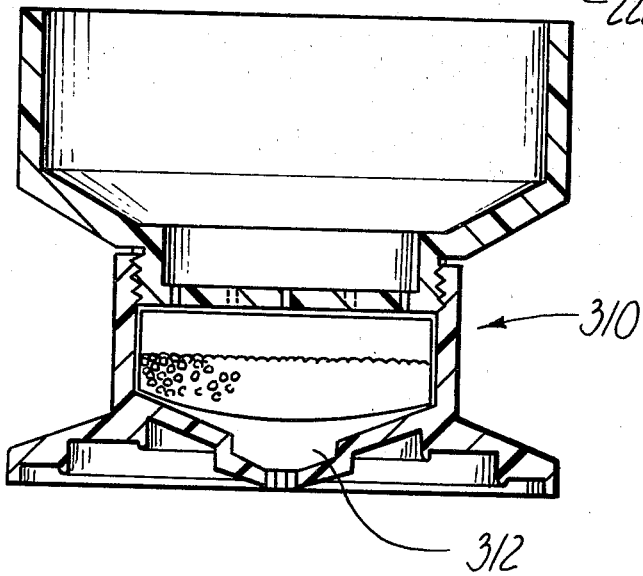
FIG. 6 is a cross-sectional view of another embodiment of the present invention.

In FIG. 6 there is depicted a further embodiment hereof, denoted at 310. This embodiment combines the features of the embodiment of FIG. 5 while incorporating thereinto a chamber 312 analogous to chamber 112 of the embodiment of FIG. 4. In all other respects the embodiment of FIG. 6 is similar to that disclosed in FIG. 5.

Figure 7:
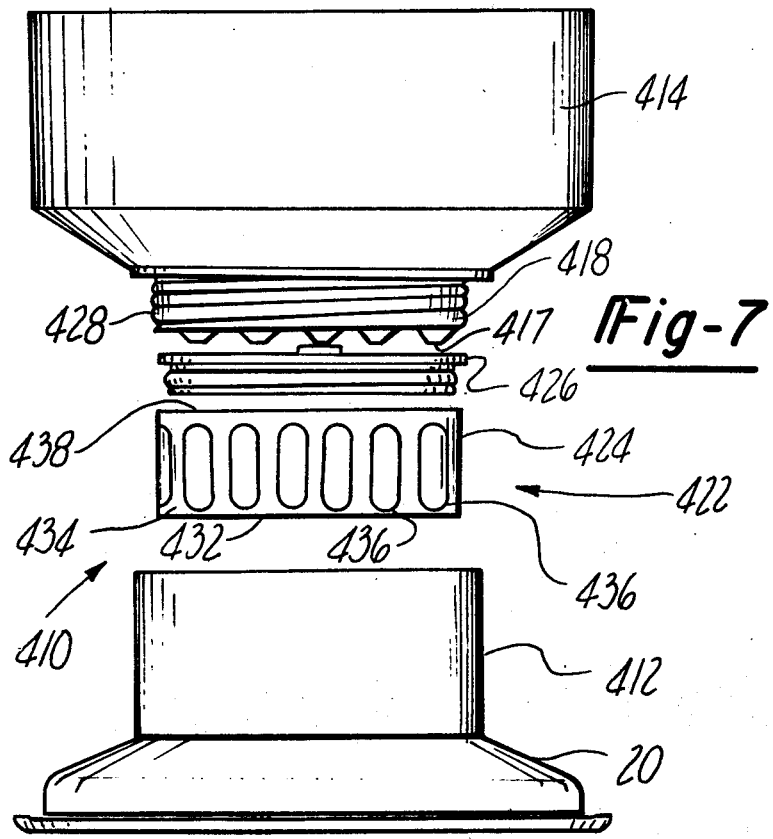
FIG. 7 is an exploded, side elevational view of a further embodiment of the invention.
Figure 8:
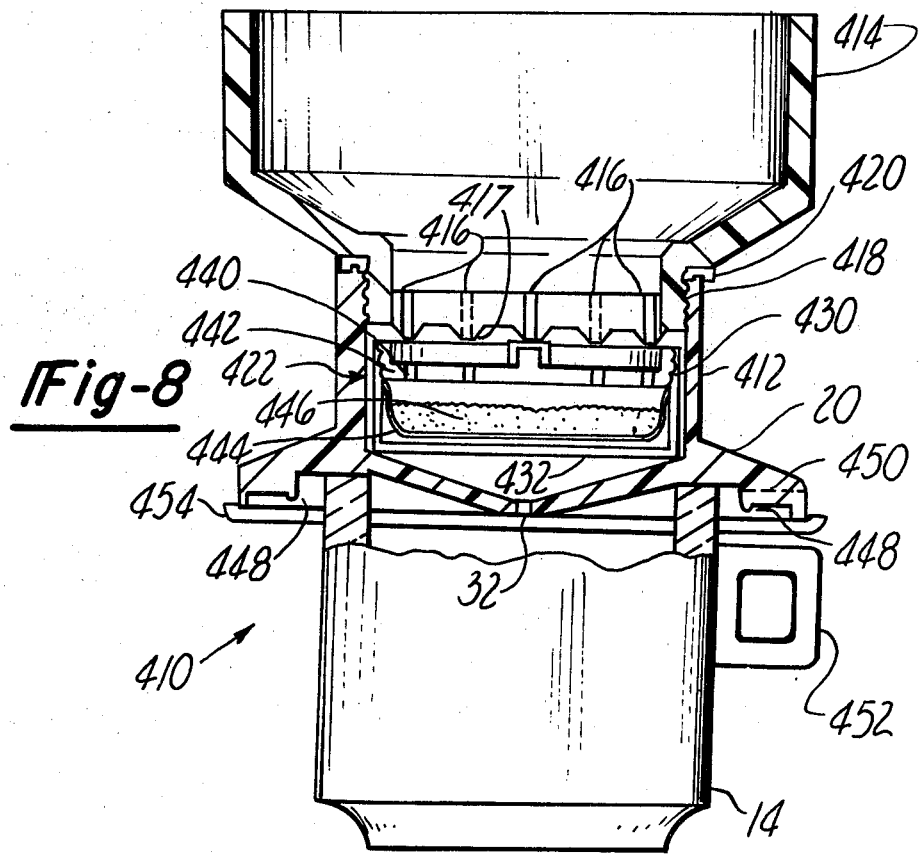
FIG. 8 is a cross-sectional view of the embodiment of FIG. 7.

Referring, now, to FIGS. 7 and 8 there is depicted therein a further embodiment of the present invention, generally, denoted at 410. In accordance with this embodiment, the brewer hereof comprises first and second members 412, 414, respectively. The second or upper member defines a brewing fluid receptacle from which the brewing fluid, such as hot water, issues. The lower terminus of the upper member is provided with a plurality of apertures 416. The brewing fluid issues through the apertures 416.

The first member is interconnectable to the second member through suitable means such as the threaded profile 418, in the manner heretofore described.

Sealing means, such as gasket 420, effectuates the sealing between the first and second members upon the interconnection therebetween.

According to this embodiment of the present invention, the "grounds" receiving chamber is defined by a separate basket, generally, denoted at 422. The basket 422 is adapted to be seatingly disposed within the first or lower member 412, as shown. The basket 422 comprises a bottom member 424 and a lid 426. The bottom member and the lid are separable from one another and are interconnectable by any suitable mode such as complementary threaded profiles 428, 430, as shown. Of course, other modes of achieving separable interconnection can be utilized.

The bottom member comprises a base 432 and a side wall 434. The sidewall is integral with the base 432 and extends upwardly therefrom. The sidewall is provided with a plurality of openings or slots 436 disposed circumferentially or peripherally therearound. It is through these slots that brewed beverage issues into the interior of the first member and through the bore 32.

The lid 426 has its top wall 438 formed with a plurality of apertures 440 which provide communication between the interior of the basket and the upper member, in a manner to be described subsequently. It will be noted that the lid has an annular recess 442 formed therein which defines a container or holding tank for brewing fluid.

In brewing the beverage a filter paper 444 is disposed within the basket 422 and the grounds 446 are then emplaced therewithin. The lid and basket are assembled together and placed within the first member. The second member is, then, sealingly interconnected to the first member. The brewing fluid is, then, poured into the second member wherefrom it issues through the apertures 416. Because of the dimensioning of the members, the issuing fluid flows into the recess 442, only. From the recess the fluid flows through apertures 440 and into the interior of the basket wherein the brewing occurs. The brewed beverage flows out of the basket, through the slots 436 and through the bore 32 into the cup or other receptacle.

This embodiment of the present invention further provides annular ridges 448 about the recesses 422. The ridges 448 prevent the receptacle from sliding around and, possibly, away from the brewer. Furthermore, a notch 450 is formed in the base 20. The notch is configured and dimensioned to nestingly receive the handle 452 of the receptacle 14 in those instances where the handle extends above the upper edge of the receptacle; proper.

Also, a sealing cap 454 is dimensioned to sealingly and frictionally engage the base 20, as shown. The cap is utilized to prevent any mess due to excess drippings or the like. After the receptacle is filled, the cap is merely secured, by manual emplacement, across the base. It is contemplated that the base and the top of the second member have equal diameters so that the cap can ordinarily be placed atop the second member when not on the base.

Also, in fabricating the brewer of this embodiment, flow guides 417 are utilized. The flow guides each have one aperture 416 associated therewith. The flow guides comprise downwardly depending projections formed at the bottom of the second member interiorly of the thread carrying portion, as shown. The guides ensure even distribution of the brewing medium throughout the entire basket by dispensing the medium throughout. This obviates manufacturing imperfection where flow might tend to one spot.

In fabricating the present device any suitable materials can be utilized. Preferably, the present invention is fabricated from a synthetic resinous material such as polypropylene, nylon, or the like.

It is to be appreciated from the preceding that there has been described herein a single serving beverage brewer which effectively and efficiently can be utilized for preparing coffee, tea or the like.

Furthermore, by increasing the volumetric capacity of the second member and the "grounds" storing chamber, the brewer can, then, prepare multiple servings at any one time, and such an adaptation is within the purview of the present invention.

Having, thus, described the invention, what is claimed is:

1. A beverage brewer, having first and second members for use in conjunction with a brewed beverage receiving receptacle, comprising:
   (1) a first member comprising:
       means for seating said first member on the brewed beverage receiving receptacle,
       means for issuing brewed beverage from the first member into the brewed beverage receiving receptacle,
       said first member having a chamber for receiving a ground foodstuff,
   (2) a second member interconnectable with the first member, the second member having at least one aperture formed therein for passing a brewing fluid from the second member to said chamber, and
       gasket means defining an atmospheric seal upon interconnection between the first and second members, said atmospheric seal resulting in an air pressure differential between the atmosphere and said chamber, on introduction of the brewing fluid, which draws the brewing fluid through the brewer, limiting the holding time of the brewing fluid in the chamber and preventing the accumulation of fluid in the chamber and the floating or soaking of the ground foodstuff therein.

2. The brewer of claim 1 wherein the first member comprises:
   (a) a base having at least one annular recess formed therein and defining the seating means
   (b) an inverted conical member integrally formed therewith, the interior of the first member defining the foodstuff receiving means, and
   (c) a bore formed at the apex and extending between the chamber and the atmosphere, providing communication between the interior of the conical member and the atmosphere, the bore defining the issuing means.

3. The brewer of claim 2 wherein the first member further comprises:
   a chamber formed integrally with and depending downwardly from the conical member, and registering with said foodstuff receiving means.

4. The brewer of claim 1 wherein:
   (a) said receptacle is a single serving cup, and
   (b) said brewer is a single serving brewer.

5. The brewer of claim 1 wherein the second member comprises:
   an open topped container having a diameter less than that of the first member, the container being nestable within the first member and comprising:
   (a) a substantially cylindrical sidewall, p2 (b) a base, the base being integrally formed with the sidewall and having a plurality of apertures formed therein, the apertures providing communication between the interior of the container and the chamber.

6. The brewer of claim 1 wherein the first member further comprises:
   (1) a base, the base defining the seating means,
   (2) a substantially cylindrical sidewall extending upwardly from the base,
   (3) an apical wall enclosing the bottom of the sidewalls, the sidewall and apical wall defining an open topped member, the interior of which defines the chamber,
   (4) a threaded profile formed on the sidewall proximate the open top thereof, and the second member further comprises:
   (1) an open topped container, having a substantially cylindrical sidewall,
   (2) a reduced diameter neck depending from the sidewall and integral therewith,
   (3) a base wall integral with the neck, the base wall having a plurality of apertures fromed therein for providing communication between the interior of the second member and the interior of the first member, the neck having a threaded profile, the neck being threadably connectable to the threaded profile of the first member, the gasket defining the sealing means disposed on the second member at the junction of the neck and the sidewall, and
   wherein the seal is effectuated between the first and second members upon the threaded interengagement therebetween.

7. The brewer of claim 1 which further comprises:
   a filter paper disposed in the chamber.

8. The brewer of claim 1 which further comprises:
   a basket removably disposed within the interior of the first member, the interior of the basket forming the chamber which defines the foodstuff receiving means.

9. The brewer of claim 8 wherein the basket comprises:
   (a) a bottom member having a base and a sidewall integrally formed therewith, the sidewall having an opening formed therein for issuing brewed beverage therefrom into the first member, and
   (b) a lid interconnectable to the bottom member, the lid having a plurality of aperture formed therethrough such that brewing fluid passes from the second member through the apertures and into the interior of the basket.

10. The brewer of claim 8 which further comprises:
    a cap for sealing off the means for issuing brewed beverage to prevent dripping of excess beverage.

11. The brewer of claim 1 wherein the first member further comprises:
    a base, the base defining the seating means, the base having a plurality of annular recesses formed therein, the recesses having different diameters for accommodating receptacles of varying diameters.

12. The brewer of claim 11 which further comprises
    an annular ridge associated with each recess formed in the base, the ridge preventing slippage of the receptacle.

13. The brewer of claim 11 wherein:
    the base has a notch formed therein for nestingly receiving a handle associated with the receptacle.

14. The brewer of claim 1 which further comprises:
    a cap for sealing off the means for issuing brewed beverage to prevent dripping of excess beverage.

* * * * *